United States Patent
Zhu

(10) Patent No.: US 11,453,404 B2
(45) Date of Patent: Sep. 27, 2022

(54) GEAR BASED VEHICLE LOAD INFERENCE SYSTEM

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 327 days.

(21) Appl. No.: 16/562,181

(22) Filed: Sep. 5, 2019

(65) Prior Publication Data

US 2021/0070310 A1    Mar. 11, 2021

(51) Int. Cl.
| | |
|---|---|
| *B60W 40/13* | (2012.01) |
| *G05D 1/02* | (2020.01) |
| *G05D 1/00* | (2006.01) |
| *G05B 13/02* | (2006.01) |

(52) U.S. Cl.
CPC .......... *B60W 40/13* (2013.01); *G05B 13/027* (2013.01); *G05D 1/0088* (2013.01); *G05D 1/0221* (2013.01); *B60W 2400/00* (2013.01); *B60W 2556/10* (2020.02); *G05D 2201/0213* (2013.01)

(58) Field of Classification Search
CPC ............ B60W 40/13; B60W 2556/10; B60W 2400/00; G05B 13/027; G05D 1/0088; G05D 1/0221; G05D 2201/0213
See application file for complete search history.

(56) References Cited

U.S. PATENT DOCUMENTS

| | | | |
|---|---|---|---|
| 2013/0035827 A1* | 2/2013 | Breed .................. | G01G 19/024 701/45 |
| 2014/0377719 A1* | 12/2014 | Johnsson ............. | G09B 19/165 434/29 |
| 2016/0150451 A1* | 5/2016 | Barreto De Miranda Sargento .... H04W 48/16 370/332 |
| 2018/0300964 A1* | 10/2018 | Lakshamanan .... | G01C 21/3492 |
| 2018/0322365 A1* | 11/2018 | Yehezkel Rohekar ...................... G06K 9/6257 |
| 2019/0025857 A1* | 1/2019 | Luckevich ........... | G05D 1/0295 |
| 2020/0026960 A1* | 1/2020 | Park ..................... | G06K 9/4633 |
| 2020/0074266 A1* | 3/2020 | Peake .................. | G01S 17/931 |
| 2020/0257301 A1* | 8/2020 | Weiser ..................... | G06N 3/02 |

\* cited by examiner

*Primary Examiner* — Frederick M Brushaber
*Assistant Examiner* — Elizabeth Yang
(74) *Attorney, Agent, or Firm* — Womble Bond Dickinson (US) LLP

(57) ABSTRACT

According to various embodiments, described herein are methods and systems for collecting data for training a load inference regression model for use in an ADV. According to one exemplary method, an ADV is manually driven on a segment of a road for a number of periods of time. During each period of time, a set of features of the ADV are recorded, including one or more features at a first time prior to a gear shift from a first gear position to a second gear position, and one or more features at a second time after the gear shift. For each of the number of periods of time, a weight of the ADV is also recorded using a weight sensor. The recorded features and the total weight of the ADV for each of the periods of time are then used to train a neural network regression model for inferring a load of the ADV in real time.

20 Claims, 9 Drawing Sheets

GEAR BASED VEHICLE LOAD INFERENCE SYSTEM

TECHNICAL FIELD

Embodiments of the present disclosure relate generally to autonomous vehicles. More particularly, embodiments of the disclosure relate to a load inference system for use in an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle (ADV) relies on various actuator commands (e.g., throttle/brake) in real time driving to control the ADV. Sometimes these actuator commands need to be dynamically adjusted based on the loads in the ADV. Some other times, the ADV needs to know when the loads on the ADV have reached the maximum capacity of the ADV. However, weigh sensors may not be always available on an ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
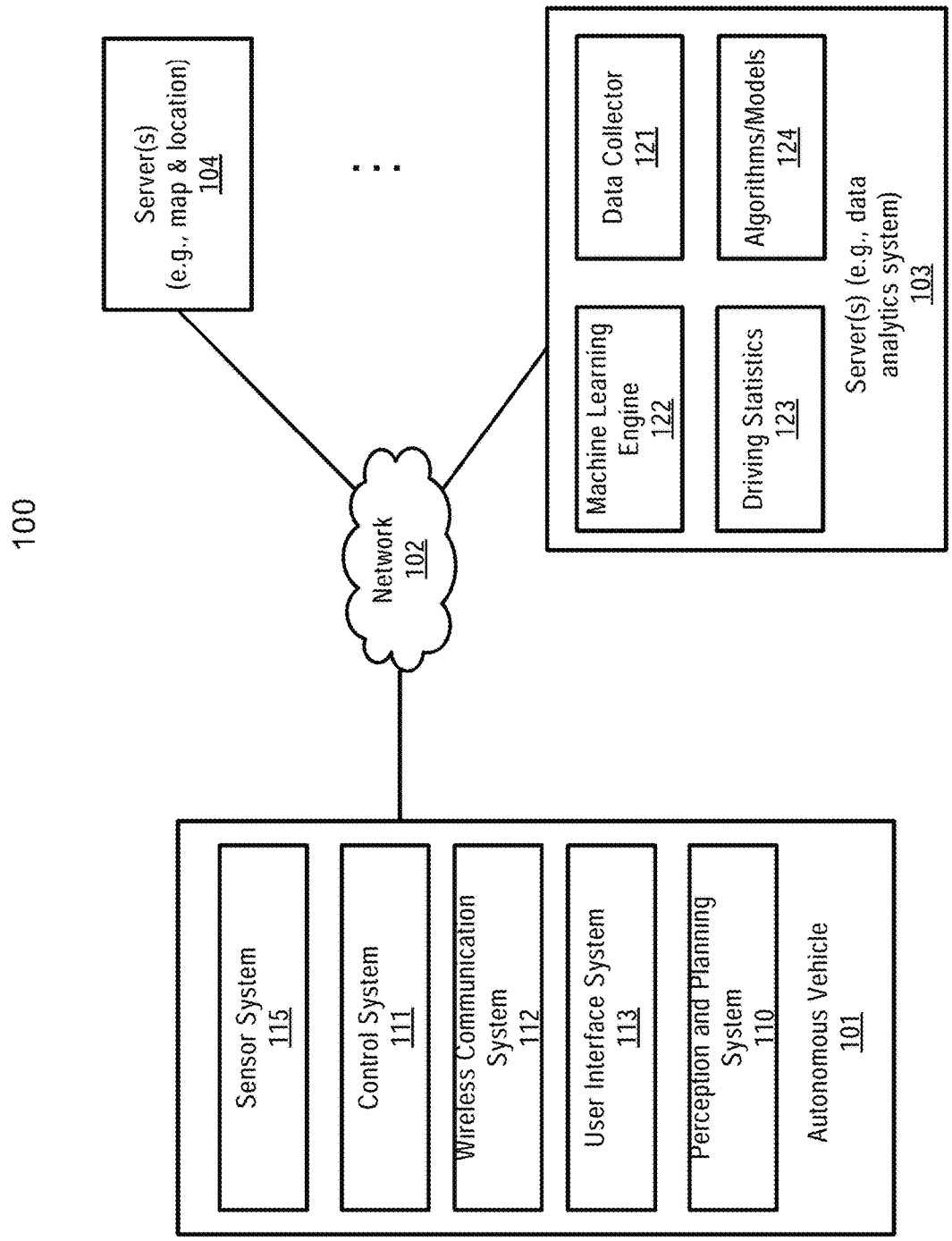
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, described herein are methods and systems for collecting data for training a load inference regression model for use in an ADV. According to one exemplary method, an ADV is manually driven on a segment of a road for a number of periods of time. During each period of time, a set of features of the ADV are recorded, including one or more features at a first time prior to a gear shift from a first gear position to a second gear position, and one or more features at a second time after the gear shift. For each of the number of periods of time, a weight of the ADV is also recorded using a weight sensor. The recorded features and the total weight of the ADV for each of the periods of time are then used to train a neural network regression model for inferring a load of the ADV in real time.

In one embodiment, the weight of a load on the ADV can be calculated by subtracting a net weight of the ADV from the recorded total weight of the ADV. The one or more features prior to the gear shift at the first time can include a speed of the ADV, a driving command issued, an acceleration or deceleration, and an initial gear position. The one or more features after the gear shift at the second time include a second gear position, i.e. the gear position after the gear shift.

In one embodiment, the first time and the second time are two adjacent points of time, and the interval between them are the time it takes to change the gear from the first position to the second position. The first position is the initial position of the gear and the second position is the target position of the gear.

In one embodiment, the training data and testing data for the regression model are collected only at the first time and the second time associated with gear position changes. In collecting the training data, an ADV can be manually driven for multiple periods of time. During each period of time, the load on the ADV is increased by a fixed amount, e.g., 50 kilograms, and the ADV is sped up or down so that the gear positions have to be shifted.

In one embodiment, a method of inferring a load on an ADV can include the operations of receiving, at a trained load inference model running on the ADV, features of the ADV, including one or more features at a first time prior to a gear shift from a first gear position to a second gear position and one or more features at a second time after the gear shift; and generating, by the trained load inference model, a weight of a load on the ADV based on the features.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
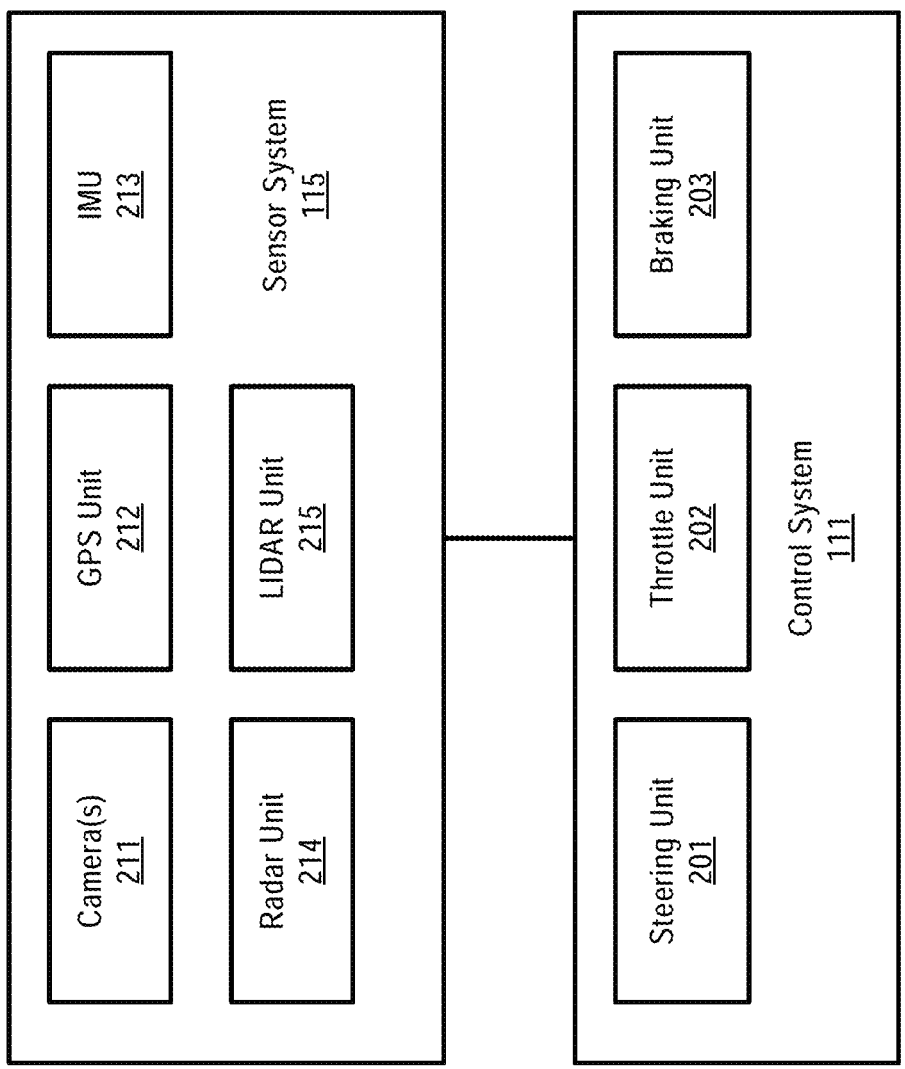
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
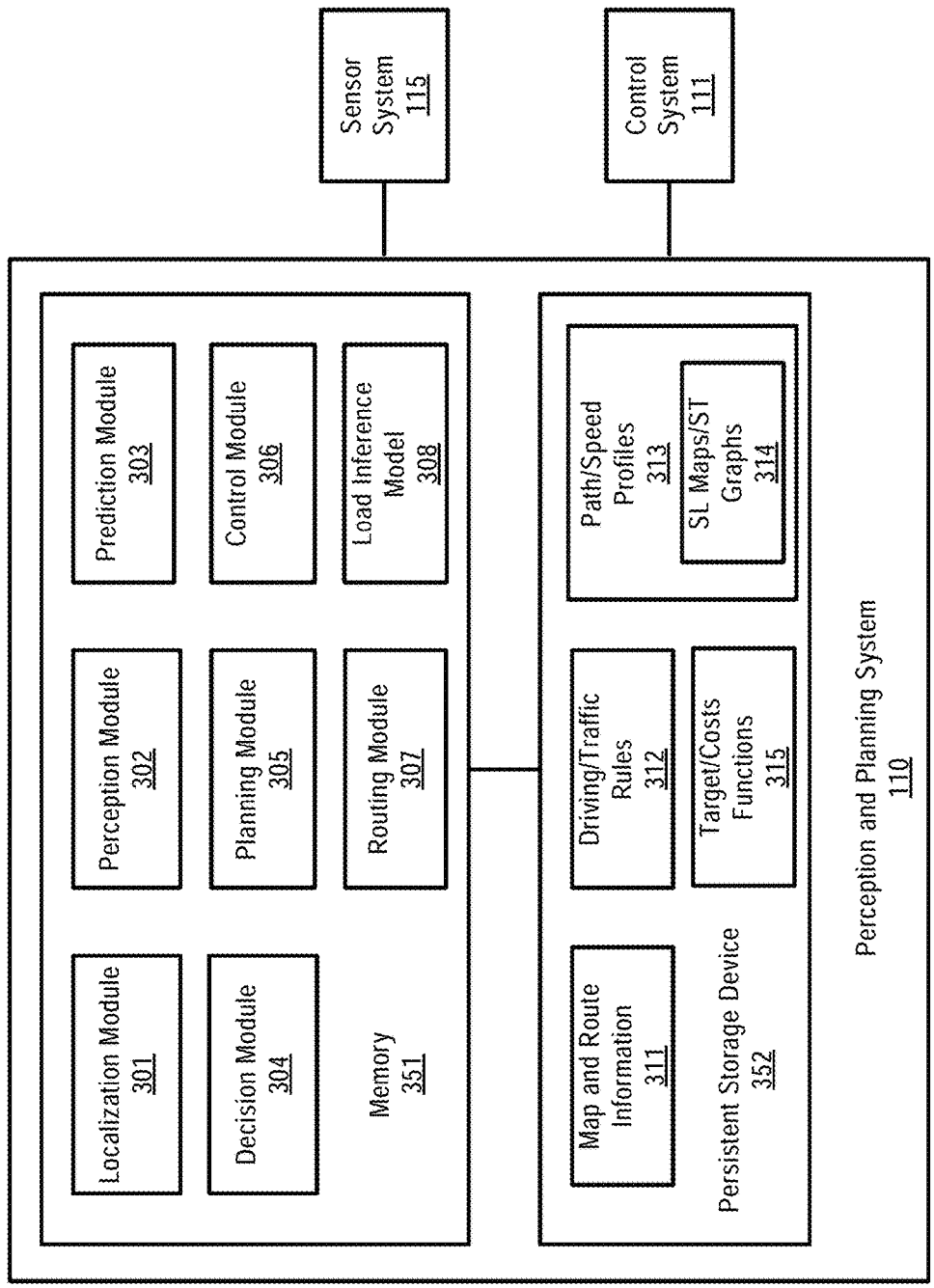
FIGS. 3A-3B are block diagrams illustrating an example of a perception and planning system used with an autonomous vehicle according to one embodiment.
Figure 3B:
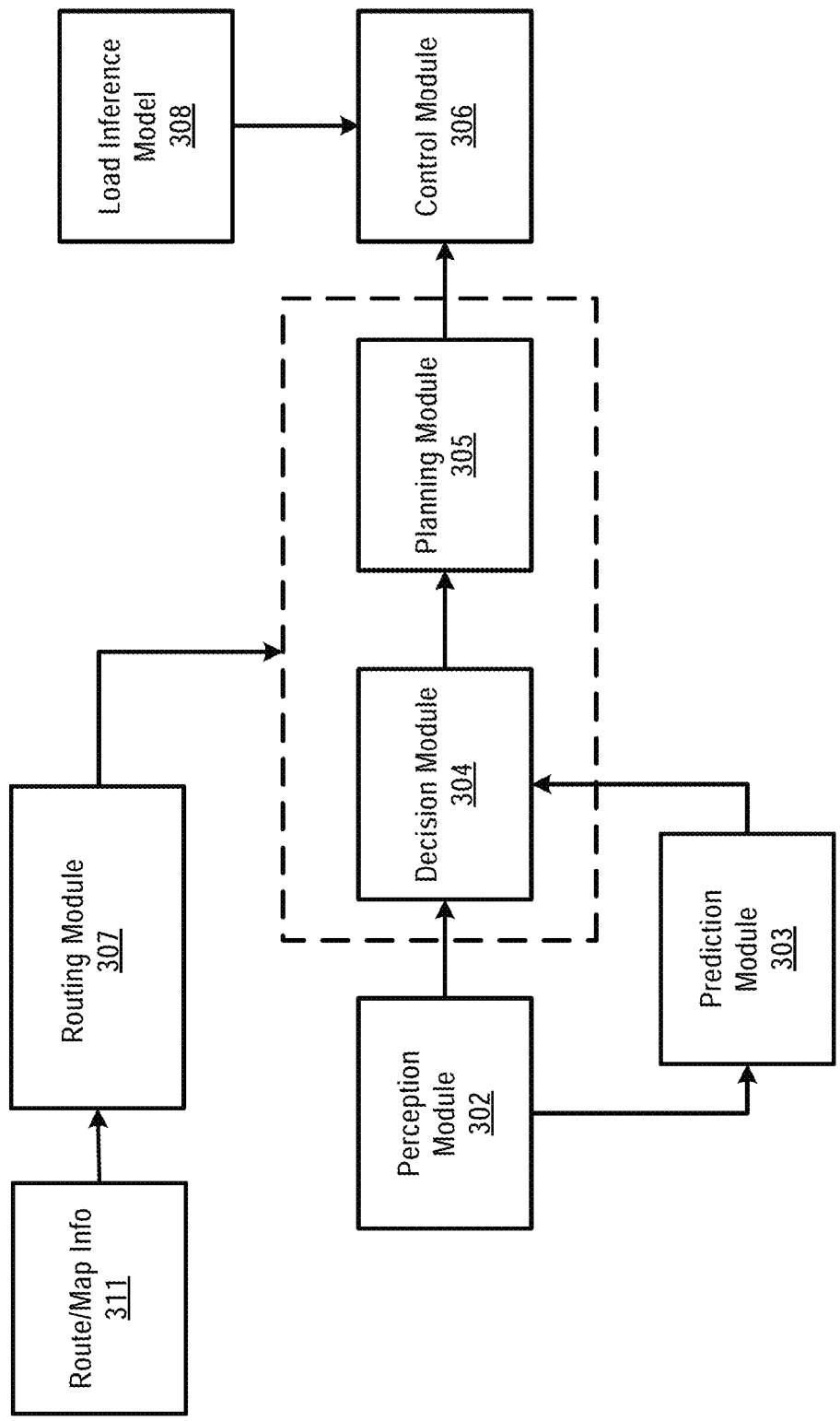

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and load reference module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

In one embodiment, the load reference module 308 is a trained regression neural network that can infer a load of the ADV based on a number of gear-based features collected in real time. The gear-based features can include features at a first time prior to a gear shift, for example, a speed of the ADV, a driving command of the ADV, acceleration/deceleration of the ADV, and an initial gear position; and one or more features at a second time after the gear shift, for example, a target gear position after the gear shift. The inferred load of the ADV can be used to dynamically adjust driving commands in real time. For example, if the load of the ADV is larger, the throttle percentage or brake percentage needs to be increased in order to maintain the same acceleration or deceleration.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps to determine the driving path for the autonomous vehicle.

Load Inference System

Figure 4:
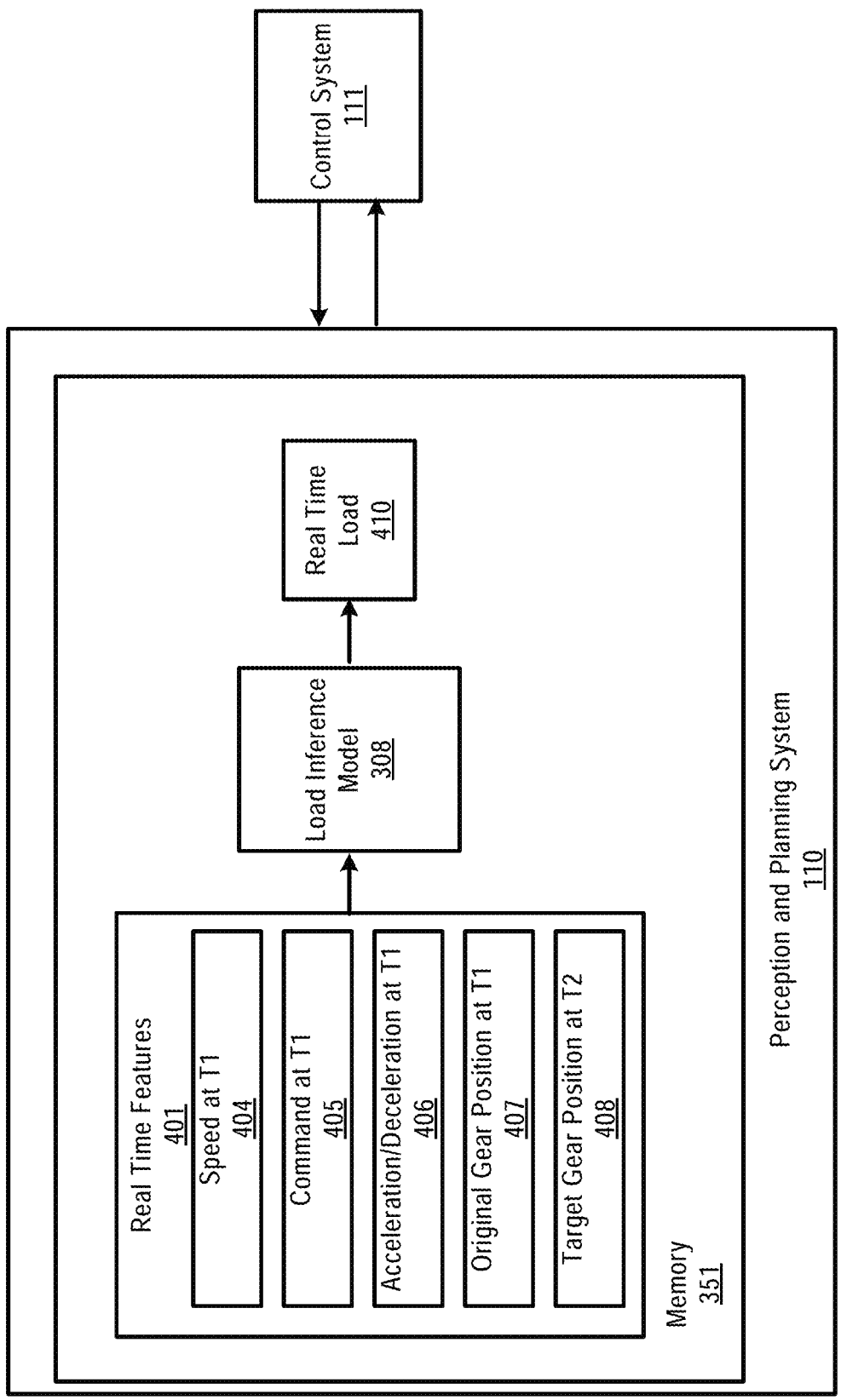
FIG. 4 illustrates an example diagram showing a load inference system according to one embodiment.

FIG. 4 illustrates an example diagram showing a load inference system according to one embodiment. As shown in FIG. 4, the load inference model 308 can take real time features 401 of the ADV as inputs and infer a real time load 410 of the ADV. The real time features can include a speed of the ADV at the first time 404, a driving command issued at the first time 405, an acceleration or deceleration at the first time 406, and an original (i.e., initial) gear position 407. The one or more features after the gear shift at the second time include a second gear position 408.

In one embodiment, the first time is the time when the ADV is about to change gear to speed up or slow down, and the second time is the time when the gear change is completed. The driving command can include a throttle percentage, or a brake percentage.

In one embodiment, the input to the load inference model 308 can include each individual feature, and a combination of multiple features. For example, the input to the load inference model 308 can include a speed of the ADV at the first time, a driving command issued at the first time, an acceleration or deceleration at the first time, an initial gear position, and a second gear position at a second time; and a combination of any two of the above features.

In one embodiment, the real time features can be collected from the control system 111, and a real time load 410 inferred from the load inference model 308 can be provided to the control system for use in dynamically adjusting one or more actuator commands, i.e. driving commands, such as a throttle percentage or a brake percentage.

Figure 5:
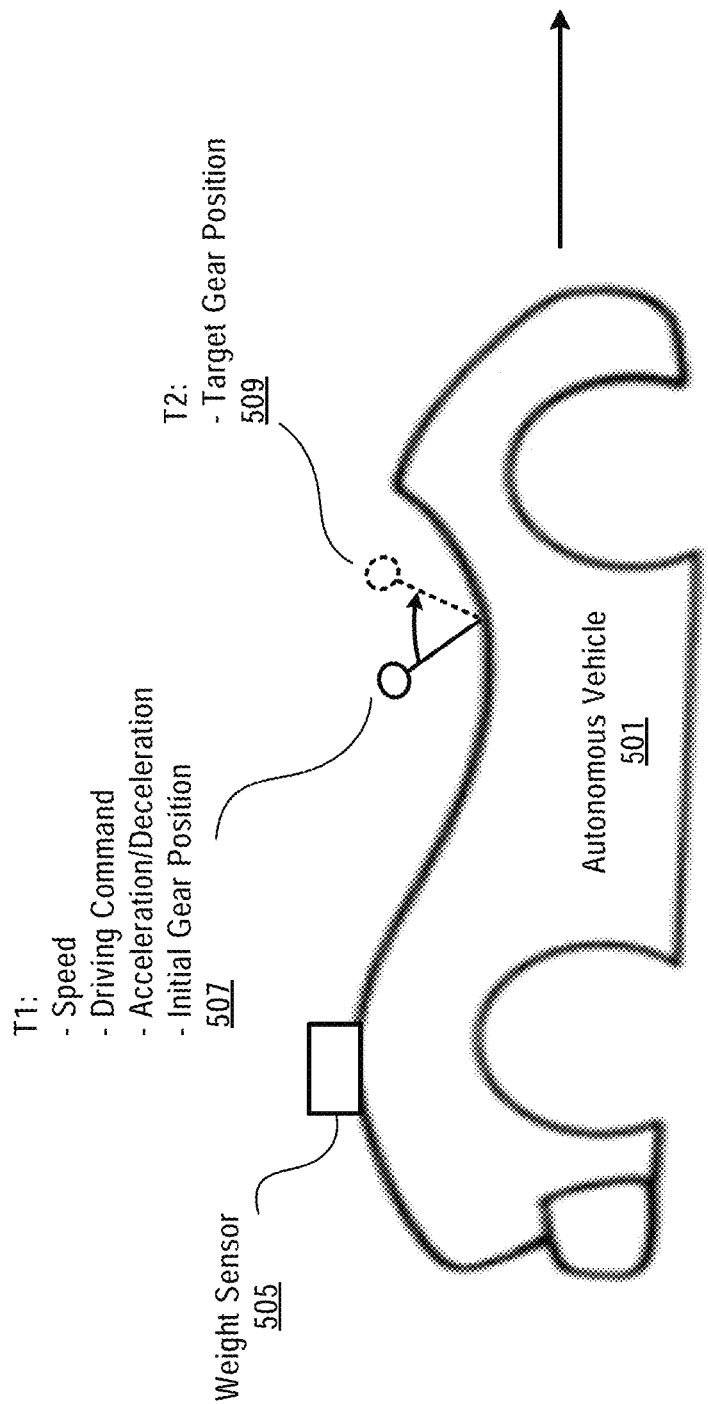
FIG. 5 illustrates the collection of data for training the load inference model according to one embodiment.

FIG. 5 illustrates collecting data for training a load inference model according to one embodiment. In one embodiment, training and testing data for the load reference model may be collected only at the moment where there is a gear change. Those points of time without a gear change are discarded. Data collected from those points of time may cause biases in the regression model, as the number of points of time without gear change is much more than the points of time with gear changes.

The vehicle 501 can be manually driven on a particular segment of road for a period of time (e.g., 20 minutes), during which the vehicle is sped up or down to generate more gear changes.

The above process can be repeated for a number of times. Each time the above process is repeated, the vehicle is reloaded with a fixed difference of weight. For example, each time the above process is repeated, the load in the vehicle is increased by 50 kilograms. One or more external sensors (e.g., weight sensor 505) can be mounted on the ADV to measure the overall weight of the vehicle 505 to obtain labeled data. Since the net weight of the ADV is known, a weight of the load on the ADV can be calculated based on the net weight of the ADV and the total measured weight of the ADV.

The label data and data collected at moments where there are gear changes are used to train and test the load inference model, for subsequent use in the vehicle 501 or a different vehicle to determine in real time the load on the vehicle 501 or on another vehicle.

Since the training and testing data are collected when there are gear changes, embodiments described in the disclosure may not be suitable for electronic vehicles or continuously variable transmission vehicles.

As shown in FIG. 5, training data is collected from a first point of time (T1) 507 and a second point of time (T2) 509.

In one embodiment, the first point of time and the second point of time are two adjacent points of time, and the interval between them is the time it takes to complete a gear shift/change. The features for each entry can include a vehicle speed at T1, a command (throttle percentage/throttle percentage) at T1, an acceleration/deceleration at T1, an original gear position at T1, and a target gear position at T2.

In one embodiment, feature combinations can also be included in each feature entry in the training data. For example, a combination of any two of the above listed features can be included in each feature entry. Further, each entry of features also include a total weight of the vehicle or a difference between the total weight of ADV and the net weight of the ADV.

Figure 6:
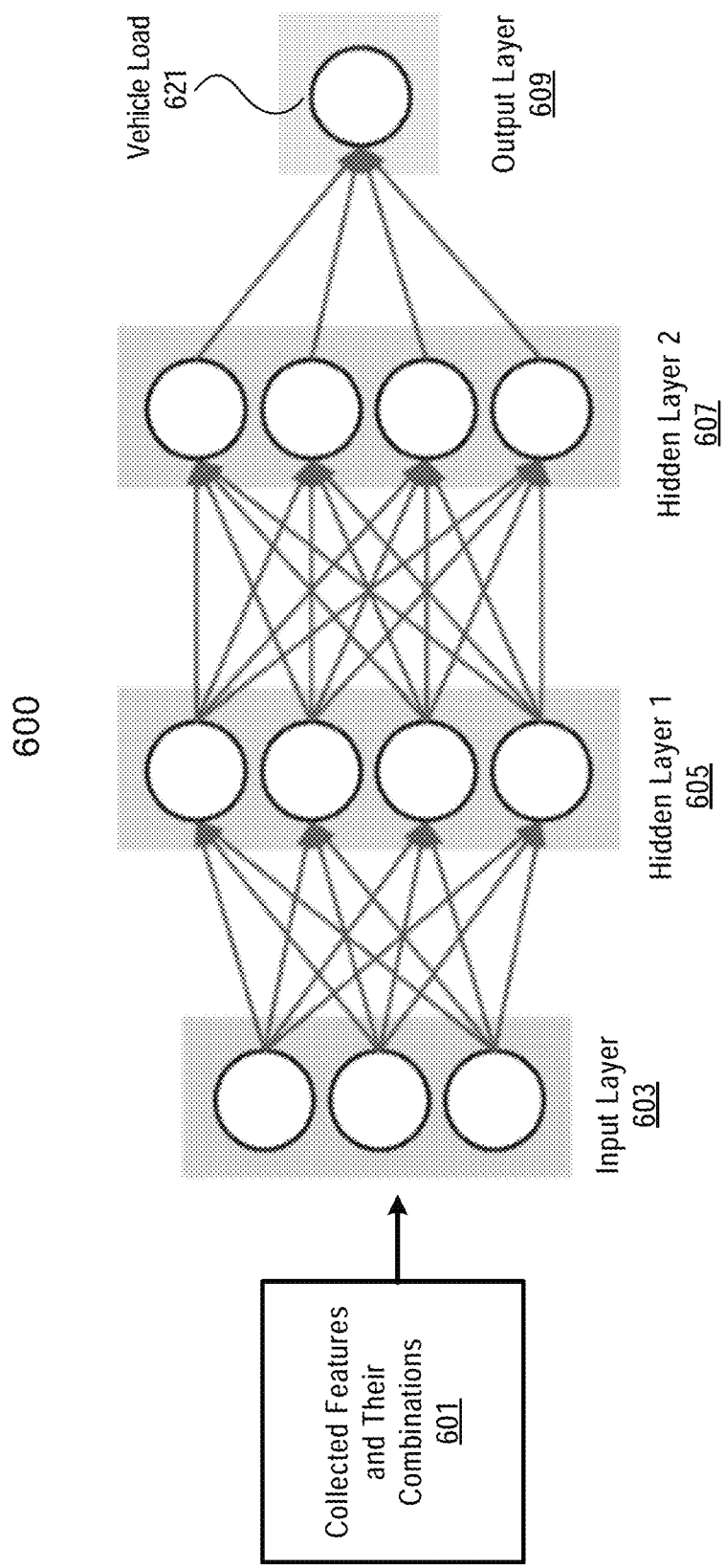
FIG. 6 illustrates an example of a load inference model according to one embodiment.

FIG. 6 illustrates an example of a load inference model 600 according to one embodiment.

In this example, the load inference model 600 can be a multilayer perceptron (MLP) neural network regression model, which is trained using data collected in a manner as described in FIG. 5. The load inference 600 model includes a collection of connected neurons designed to model a human brain. Neurons in the load inference model can be fully connected, with each node in one layer connecting with a certain weight to every node in the following layer. During the training of the load inference model, the load inference model changes connection weights after each piece of data is processed based on the amount of error in the output compared to the expected result.

In one embodiment, the load inference model 600 can include an input layer 603 to receive input data 601, an output layer 609 that makes decisions or predictions about the input data 601, and an arbitrary number of hidden layers (for example, hidden layers 606 and 607) between the input layer 603 and the output layer 609.

The hidden layers 605 and 607 are the computational engine of the load inference model 600. Neurons in the hidden layers 605 and 607 can include activation functions for transforming the input data 603. Rectified Linear Unit (ReLU) is an example activation function used in the load inference model. ReLu returns 0 if it receives any negative input; and for any positive value returns, it returns that value back. Although FIG. 6 shows two hidden layers 605 and 607 and one output layer 609, the load inference model can include additional multiple hidden layers, and additional output layers.

In an embodiment, the input data 601 for the load inference model 600 includes features of an ADV at a first time and a second time. The first time and the second can be two adjacent points of time prior to and after a gear position change. The features at the first time can include states of an ADV (e.g., a speed, an acceleration, and an angular velocity), control commands (e.g., a throttle command, a brake command, and a steering command), and a first gear position prior to a gear shift. The features at the second time can include a target gear position. The input data 601 can also include combinations of these above-described features. For example, the input data 601 can include combinations of any two of the above-described features. Further, the input data can also include measured weights of the ADV, or weights of loads on the ADV during different periods of time for collecting training and testing data.

The input data 601 can be processed by the hidden layers 605 and 607, and can be transformed to data in the output data 609. The data can be an expected total weight of the ADV, or an expected weight of a load on the ADV.

Figure 7:
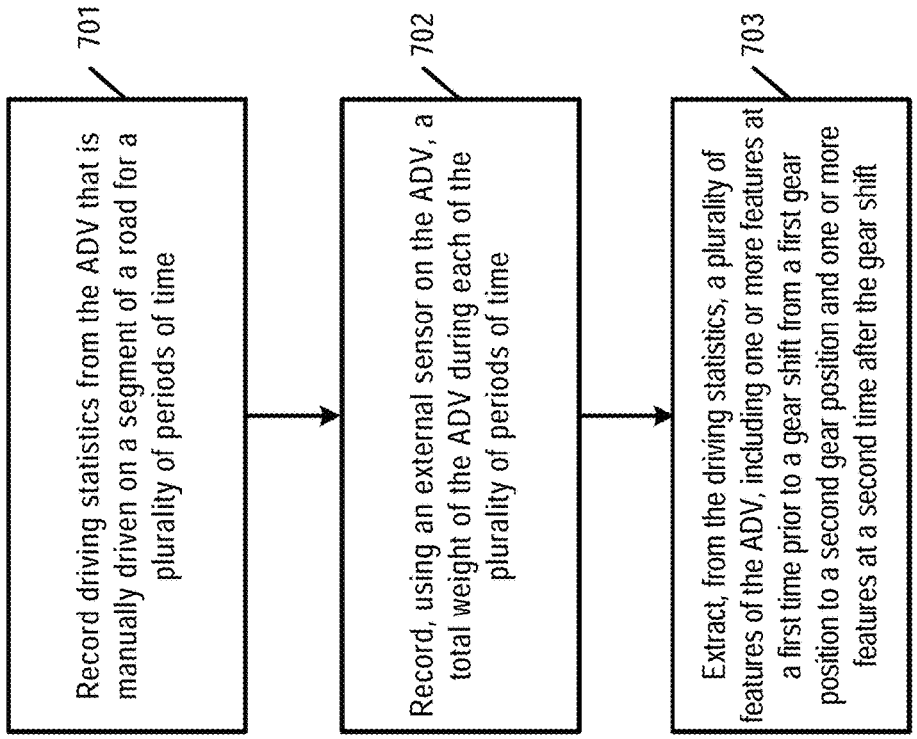
FIG. 7 illustrates an example process of collecting data for training a load inference model according to one embodiment.

FIG. 7 illustrates an example process 700 of collecting data for training a load inference model according to one embodiment. Process 700 may be performed by processing logic, which may include software, hardware, or a combination thereof.

Referring back to FIG. 7, in operation 701, the processing logic records driving statistics from the ADV that is manually driven on a segment of a road for a number of periods of time. In operation 702, the processing logic uses an external sensor on the ADV to record a total weight of the ADV during each of the number of periods of time. In operation 703, the processing logic extracts, from the driving statistics, a plurality of features of the ADV, including one or more features at a first time prior to a gear shift from a first gear position to a second gear position and one or more features at a second time after the gear shift.

Figure 8:
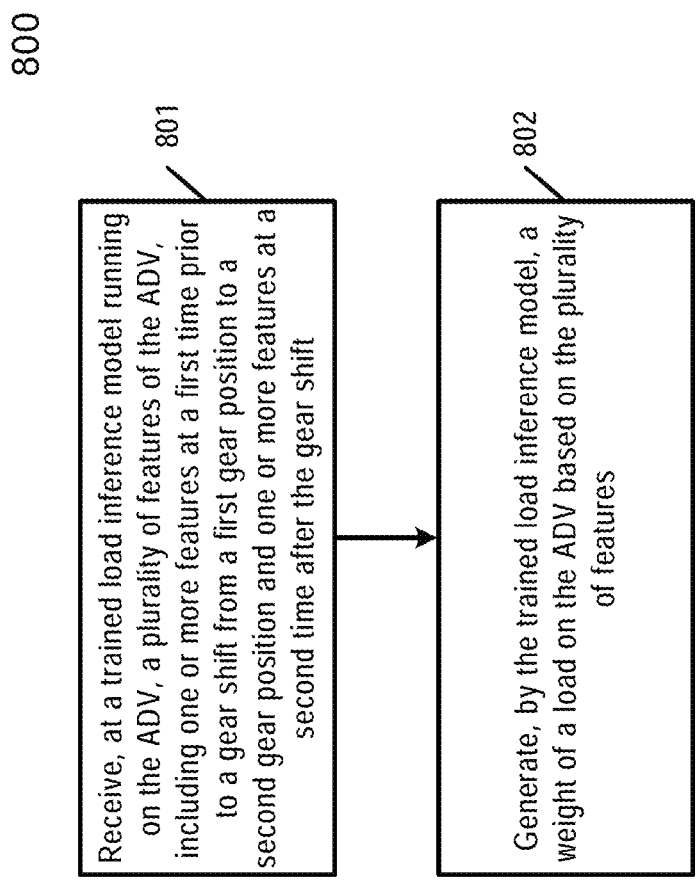
FIG. 8 illustrates an example process of inferring a weight of a load on an ADV according to one embodiment.

FIG. 8 illustrates an example process 800 of inferring a weight of a load on an ADV according to one embodiment. Process 800 may be performed by processing logic, which may include software, hardware, or a combination thereof. For example, the processing logic can be performed by the load inference model 308 as described in FIG. 4.

Referring back to FIG. 8, in operation 801, the processing logic receives a number of features of the ADV, including one or more features at a first time prior to a gear shift from a first gear position to a second gear position and one or more features at a second time after the gear shift. In operation 802, the processing logic generates a weight of a load on the ADV based on the plurality of features.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of collecting data for training a load inference model for use in an autonomous driving vehicle (ADV), the method comprising:
    recording, by the ADV, a set of driving statistics of the ADV during each of a plurality of trips on a road segment, wherein the ADV is manually driven on the road segment and has a different load during each of the plurality of trips, wherein the ADV performs a plurality of gear shifts during each of the plurality of trips;
    recording, by the ADV, a total weight of the ADV during each of the plurality of trips;
    extracting, from the set of driving statistics, a plurality of features of the ADV associated with each of the plurality of gear shifts during each of the plurality of trips, including one or more features at a first time prior to each gear shift from a first gear position a second gear position and one or more features at a second time after the gear shift, wherein the plurality of features are utilized to train the load inference model, wherein the load inference model is a neural network model and is to determine a load of the ADV to dynamically adjust actuator commands of the ADV.

2. The method of claim 1, further comprising:
    calculating a weight of a load on the ADV by subtracting a net weight of the ADV from the recorded total weight of the ADV.

3. The method of claim 1, further comprising:
    training the load inference model using the plurality of features and a weight of the load on the ADV for each of the plurality of trips.

4. The method of claim 1, wherein the one or more features after the gear shift at the second time includes a value indicating the second gear position.

5. The method of claim 1, wherein the total weight of the ADV is increased by a fixed weight of load for each of the plurality of trips.

6. The method of claim 1, wherein the total weight of the ADV during each of the plurality of trips is recorded using a weight sensor mounted on the ADV.

7. A non-transitory machine-readable medium having instructions stored therein for collecting data for training a load inference model for use in an autonomous driving vehicle (ADV), which instructions, when executed by a processor, cause the processor to perform operations, the operations comprising:
    recording, by the ADV, a set of driving statistics of the ADV during each of a plurality of trips on a road segment, wherein the ADV is manually driven on the road segment and has a different load during each of the plurality of trips, wherein the ADV performs a plurality of gear shifts during each of the plurality of trips;
    recording, by the ADV, a total weight of the ADV during each of the plurality of trips;
    extracting, from the set of driving statistics, a plurality of features of the ADV associated with each of the plurality of gear shifts during each of the plurality of trips, including one or more features at a first time prior to each gear shift from a first gear position to a second gear position and one or more features at a second time after the gear shift, wherein the plurality of features are utilized to train the load inference model, wherein the load inference model is a neural network model and is to determine a load of the ADV to dynamically adjust actuator commands of the ADV.

8. The non-transitory machine-readable medium of claim 7, further comprising:
    calculating a weight of a load on the ADV by subtracting a net weight of the ADV from the recorded total weight of the ADV.

9. The non-transitory machine-readable medium of claim 7, further comprising:
    training the load inference model using the plurality of features and a weight of the load on the ADV for each of the plurality of trips.

10. The non-transitory machine-readable medium of claim 7, wherein the one or more features prior to the gear shift at the first time includes a speed of the ADV at the first time, a driving command issued at the first time, and an acceleration or deceleration at the first time.

11. The non-transitory machine-readable medium of claim 7, wherein the one or more features after the gear shift at the second time includes a value indicating the second gear position.

12. The non-transitory machine-readable medium of claim 7, wherein the total weight of the ADV is increased by a fixed weight of load for each of the plurality of trips.

13. The non-transitory machine-readable medium of claim 7, wherein the total weight of the ADV during each of the plurality of trips is recorded using a weight sensor mounted on the ADV.

14. A data processing system, comprising:
- a processor;
- a memory coupled to the processor and storing program instructions for training a load inference model for use in an autonomous driving vehicle (ADV), which, when executed by the processor, cause the processor to perform operations comprising:
- recording, by the ADV, a set of driving statistics of the ADV during each of a plurality of trips on a road segment, wherein the ADV is manually driven on the road segment and has a different load during each of the plurality of trips, wherein the ADV performs a plurality of gear shifts during each of the plurality of trips;
- recording, by the ADV, a total weight of the ADV during each of the plurality of trips;
- extracting, from the set of driving statistics, a plurality of features of the ADV associated with each of the plurality of gear shifts during each of the plurality of trips, including one or more features at a first time prior to each gear shift from a first gear position to a second gear position and one or more features at a second time after the gear shift, wherein the plurality of features are utilized to train the load inference model, wherein the load inference model is a neural network model and is to determine a load of the ADV to dynamically adjust actuator commands of the ADV.

15. The data processing system of claim 14, the operations further comprising:
- calculating a weight of a load on the ADV by subtracting a net weight of the ADV from the recorded total weight of the ADV.

16. The data processing system of claim 14, the operations further comprising:
- training the load inference model using the plurality of features and a weight of the load on the ADV for each of the plurality of trips.

17. The data processing system of claim 14, wherein the one or more features prior to the gear shift at the first time includes a speed of the ADV at the first time, a driving command issued at the first time, and an acceleration or deceleration at the first time.

18. The data processing system of claim 14, wherein the one or more features after the gear shift at the second time includes a value indicating the second gear position.

19. The data processing system of claim 14, wherein the total weight of the ADV is increased by a fixed weight of load for each of the plurality of trips.

20. The data processing system of claim 14, wherein the total weight of the ADV during each of the plurality of trips is recorded using a weight sensor mounted on the ADV.

* * * * *